United States Patent [19]

Blahut

[11] Patent Number: 4,745,548
[45] Date of Patent: May 17, 1988

[54] DECENTRALIZED BUS ARBITRATION USING DISTRIBUTED ARBITERS HAVING CIRCUITRY FOR LATCHING LOCKOUT SIGNALS GATED FROM HIGHER PRIORITY ARBITERS

[75] Inventor: Donald E. Blahut, Holmdel, N.J.

[73] Assignee: American Telephone and Telegraph Company, AT&T Bell Laboratories, Murray Hill, N.J.

[21] Appl. No.: 9,634

[22] Filed: Jan. 23, 1987

Related U.S. Application Data

[63] Continuation-in-part of Ser. No. 581,258, Feb. 17, 1984, abandoned.

[51] Int. Cl.[4] ............... G06F 13/00; G06F 13/18; G06F 13/26; G06F 13/36
[52] U.S. Cl. .................. 364/200; 340/825.05; 340/825.51
[58] Field of Search ... 364/200 MS File, 900 MS File; 340/825.5, 825.51

[56] References Cited

U.S. PATENT DOCUMENTS

| | | | |
|---|---|---|---|
| 4,124,889 | 11/1978 | Kaufman | 364/200 |
| 4,373,183 | 2/1983 | Means et al. | 364/200 |
| 4,375,639 | 3/1983 | Johnson, Jr. | 364/200 |
| 4,385,350 | 5/1983 | Hansen | 364/200 |
| 4,449,183 | 5/1984 | Flahive et al. | 364/200 |
| 4,453,214 | 6/1984 | Adcock | 364/200 |
| 4,472,712 | 9/1984 | Ault et al. | 340/825.5 |
| 4,482,950 | 11/1984 | Dshkhunian et al. | 364/200 |
| 4,482,953 | 11/1984 | Burke | 364/200 |
| 4,488,218 | 12/1984 | Grimes | 364/200 |
| 4,499,538 | 2/1985 | Finger et al. | 364/200 |
| 4,511,959 | 4/1985 | Nicolas | 364/200 |
| 4,533,994 | 8/1985 | Harrill et al. | 364/200 |
| 4,535,330 | 8/1985 | Carey et al. | 364/900 |
| 4,543,629 | 9/1985 | Carey et al. | 364/200 |
| 4,543,630 | 9/1985 | Neches | 364/200 |
| 4,549,263 | 10/1985 | Calder | 364/200 |
| 4,556,939 | 12/1985 | Read | 364/200 |
| 4,570,217 | 2/1986 | Allen et al. | 364/188 |
| 4,571,675 | 2/1986 | Stambaugh et al. | 364/200 |
| 4,590,556 | 5/1986 | Berger et al. | 364/200 |
| 4,626,843 | 12/1986 | Szeto et al. | 340/825.5 |
| 4,642,630 | 2/1987 | Beckner et al. | 340/825.5 |

OTHER PUBLICATIONS

P. Kraynak et al., "Wafer-Chip Assembly for Large-Scale Integration," *IEEE Transactions on Electron Devices*, vol. ED-15, No. 9, Sep. 1968, pp. 660-663.
Pending U.S. patent application Ser. No. 581,259, filed Feb. 17, 1984 (K. K. Ng et al, 2-11).
Pending U.S. patent application Ser. No. 581,336, filed Feb. 17, 1984 (K. K. Ng et al, 3-12).
Pending U.S. patent application Ser. No. 581,260, filed Feb. 17, 1984 (K. K. Ng et al, 4-13).
Pending U.S. patent application Ser. No. 582,079, filed Feb. 21, 1984 (K. L. Tai, 8).

*Primary Examiner*—Archie E. Williams, Jr.
*Assistant Examiner*—Danh Phung
*Attorney, Agent, or Firm*—David I. Caplan

[57] ABSTRACT

A silicon semiconductor wafer containing a plurality of silicon integrated circuits formed therein or attached thereto contains at least one data bus to which some of the circuits are connected. Each of the circuits coupled to the data bus contains an arbitration request circuit which selectively passes a signal that requests that its circuit be given access to the data bus so it can transmit information to another circuit on the wafer. In addition, each of the circuits coupled to the data bus has an arbitration circuit which detects which of any of the circuits coupled to the data bus is requesting access to the data bus and facilitates its circuit gaining access to the data bus if its circuit has a higher preselected priority than any other circuit which is simultaneously seeking access to the data bus. The distribution of the arbitration request circuits and of the arbitration circuits simplifies layout and tends to improve the speed of operation.

19 Claims, 2 Drawing Sheets

DECENTRALIZED BUS ARBITRATION USING DISTRIBUTED ARBITERS HAVING CIRCUITRY FOR LATCHING LOCKOUT SIGNALS GATED FROM HIGHER PRIORITY ARBITERS

This application is a continuation-in-part of application Ser. No. 581,258, filed Feb. 17, 1984, (now abandoned).

CROSS-REFERENCE TO RELATED APPLICATIONS

Concurrently filed are patent applications as follows:
U.S. Ser. No. 581,259, now U.S. Pat. No. 4,613,891
U.S. Ser. No. 581,336, now U.S. Pat. No. 4,000,208
U.S. Ser. No. 581,260 (now abandoned)

In addition, relevant to this application is U.S. Ser. No. 582,079, filed Feb. 21, 1984, now U.S. Pat. No. 4,670,770.

The present application and all of the above applications have a common assignee.

TECHNICAL FIELD

This invention is directed to component mounted or formed in a common carrier and in particular to silicon integrated circuit chips formed in or attached to a silicon wafer.

BACKGROUND OF THE INVENTION

The need for very high speed large memory capacity computers is leading to the use of wafer scale integration which uses a single silicon wafer as the carrier for tens, or hundreds, or thousands of integrated circuits which are formed in the wafer and are separated from each other by p-n junction or dielectric isolation. Conductors formed on or over the top planar surface of the wafer serve to interconnect the circuits. Another similar approach is to attach wholly formed integrated circuits to a semiconductor wafer and then to interconnect the circuits with conductors. One such implementation is described in the article entitled "Wafer-Chip Assembly for Large-Scale Integration," *IEEE Transactions on Electron Devices*, Vol. ED-15, No. 9, September, 1968, pp. 660-663. Other implementations and methods of forming such implementations are described in the four patent applications which are cross-referenced above.

In most of these structures multiple integrated circuits are coupled to a common data bus with each also being coupled to common arbitration circuitry which determines which circuit gains access to the data bus if two or more circuits seek access at essentially the same time or within a preselected time period. One problem with the common arbitration circuitry is that it adds to the wiring complexity and therefore limits the number of circuits which can be used on or in a given semiconductor wafer and requires two interchip transactions which adversely affects speed performance.

It would be desirable to achieve the needed arbitration functions for multiple circuits having a common data bus without incurring the wiring and speed penalties of prior art structures.

SUMMARY OF THE INVENTION

The present invention is directed in a preferred embodiment to a semiconductor wafer with a plurality of component circuits formed therein or attached thereto. The component circuits are typically silicon integrated circuits which may be denoted as chips. Some of these chips are coupled to a common data bus and at least two or more selectively need access to the data bus such that signal information can be sent from one chip to another. Each of the chips is adapted to have a priority with respect to transmission of information onto the data bus. The carrier and at least some of the chips are of the same material. Each of the chips which needs access to the data bus comprises an arbitration request circuit and an arbitration resolution circuit. The arbitration request circuit selectively passes a signal from its chip that effectively requests that its chip be given access to the data bus such that its chip can transmit information over the data bus to another chip. The arbitration resolution circuit is adapted to detect which of any of the other chips coupled to the data bus are requesting access within a selected time period to the data bus and to facilitate its chip gaining access to the data bus if its chip has a higher priority than any other chip seeking access to the data bus during the selected time period. A plurality of arbitration conduits (conductors) exist. Each of the arbitration request circuits, except for possibly the arbitration request circuit having a lowest preselected priority, has an output terminal thereof coupled to a separate one of the arbitration conductors. Typically, each of the arbitration resolution circuits, except for possibly the arbitration resolution circuit of the chip having the highest preselected priority, is coupled to some of the arbitration conductors.

The use of a separate self-contained arbitration request circuit and a separate self-contained arbitration resolution circuit as part of each of the chips which requires selective access to a common data bus tends to reduce the interconnection wiring complexity of the system since there is no need for separate connections of each chip to a central arbitration circuit. Thus the chips can be interconnected in a variety of different configurations without concern as to how to couple same to a common arbitration circuit and without suffering the speed loss associated with the need to do two circuit transactions.

The component circuits (chips) which can be used can be Central Processing Units (CPUs), Memory Management Units (MMUs), Math Acceleration Units (MAUs), Direct Memory Access Controllers (DMACs), Dynamic Random Access Memories (DRAMs), Static Random Access Memories (SRAMs), Read Only Memories (ROMs), Gateways (GTWYs), or a variet of other circuits, including both not limited to analog circuits and to circuits which transmit and receive light signals.

Viewed from another aspect the present invention is directed to a plurality of component circuits being coupled together via a signal conduit path. Each of the component circuits is adapted to have a priority with respect to the transmission of information onto the signal conduit path. A plurality of arbitration conduit paths exists. Each of the component circuits, except for possibly the component circuit having the lowest priority, comprises a separate one of a plurality of arbitration request circuits. Each arbitration request circuit is coupled to a separate one of the arbitration conduit paths and is adapted to selectively allow a signal from its component circuit to reach the arbitration conduit path coupled thereto. Each of the component circuits, except for possibly the component circuit having a highest priority, comprises a separate one of a plurality of arbitration resolution circuits. Each arbitration resolution circuit is coupled to at least one of the arbitration conduit paths and is adapted to detect which of any of the other component circuits having a higher priority is requesting access to the signal conduit path and to enable its component circuit to gain access to the signal conduit path if its component circuit is requesting access to the signal conduit path and if its component circuit has a higher priority than any other component circuit which is requesting such access.

These and other features and advantages of the present invention may be better understood from a consideration of the hereinbelow detailed description and accompanying drawings.

DETAILED DESCRIPTION

Figure 1:
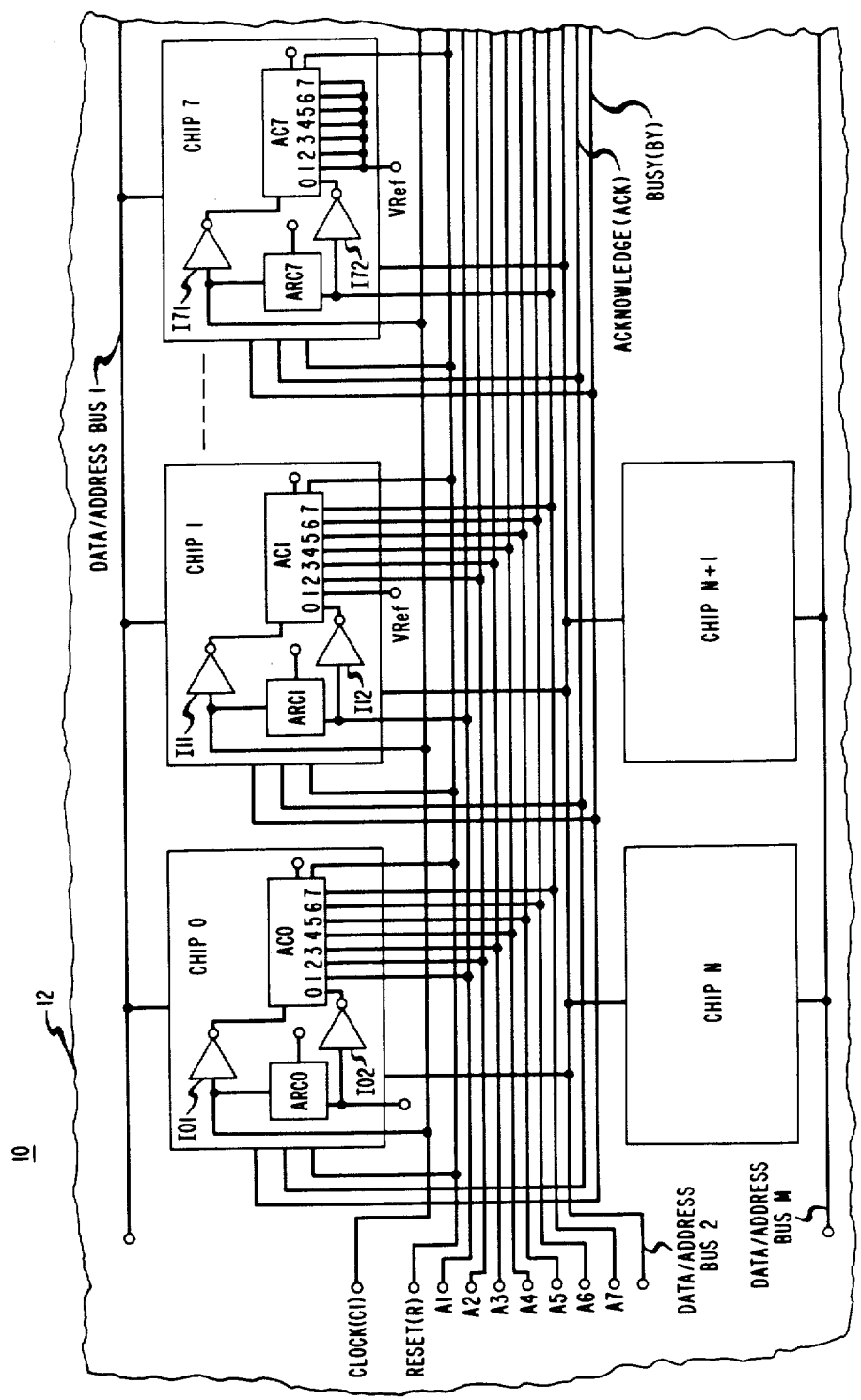
FIG. 1 illustrates a silicon wafer with silicon integrated circuits formed therein or attached thereto.

Referring now to FIG. 1, there is illustrated a system 10 comprising a wafer 12 with integrated circuits (chips) illustrated as Chip 0, Chip 1, . . . Chip 7, and Chip N and Chip N+1. These chips are only illustrative of some of the chips that can or may or do exist as part of wafer 12 or are attached to wafer 12. The wafer may be denoted as a carrier and the chips may be denoted as integrated circuits, component circuits, or ICs. Chips 0, 1, . . . 7 are illustrated coupled to Data/Address Bus 1 and to Data/Address Bus 2. The interaction of Chips 0, 1, . . . 7 with Data/Address Bus 2 will be discussed hereinbelow. It is not necessary for use of the present invention that Data/Address Bus 1 be in existence. Each of the Data/Address Buses may be referred to as a signal conduit path. Chips N and N+1 are illustrated coupled to Data/Address Bus 2 and to a Data/Address Bus M. Each of chips 0, 1, . . . 7 contains a separate arbitration request circuit (denoted as ARC0, ARC1, . . . ARC7) and a separate arbitration resolution circuit (denoted as AC0, AC1, . . . AC7). ARC0 need not exist if Chip 0 has the lowest priority of the eight chips. Each of Chips 0, 1, . . . 7 selectively needs to gain access to Data/Address Bus 2 such that signal information can be sent from one chip to another or to some circuitry (not illustrated) coupled to Data/Address Bus 2. The ARC's and the AC's generally work together to allow only one of the eight chips to send (transmit) information onto data/address bus 2 at a given time or during a given period of time. Essentially no other arbitration request circuit or arbitration resolution circuit is needed to perform this function. This allows for great flexibility in arranging different chips in essentially any needed configuration.

Seven Arbitration lines (conductors), A1, A2 . . . A7, which may be referred to as Arbitration Conduit Paths, exist with ARC1, ARC2 . . . ARC7 being coupled to A1, A2, . . . A7, respectively. ARC0 is not coupled to any of the Arbitration Conduit Paths. The AC circuits of Chips 1 through 7 have been connected to the A1, A2, . . . A7 lines or to a reference potential, with Chip 7 having highest priority and each preceding chip having lower priority, with Chip 7 having the lowest priority. The AC circuit of chip 0 is not connected to an arbitration line. This means that during an access request portion of a cycle of operation of chips 0 through 7, that if chip 7 requests access to data/address bus 2, that it will be granted access during the next appropriate transmit portion of the cycle of operation even if all other seven chips are also seeking access. Chip 0 gains access only if none of the other seven chips is requesting access at the same time or at any time during an access request portion (selected time period) of a cycle of operation.

Each of AC0, AC1, . . . AC7 has eight input terminals 0, 1, 2, 3, 4, 5, 6, and 7, as further indicated in FIG. 2. The 1 terminal of AC1, and 1 and 2 input terminals of AC2, the 1, 2, and 3 input terminals of AC3 (not expressly illustrated), the 1, 2, 3 and 4 input terminals of AC4, (not expressly illustrated), the 1, 2, 3, 4 and 5 input terminals of AC5, the 1, 2, 3, 4, 5, and 6 input terminals of AC6 (not illustrated) and the 1, 2, 3, 4, 5, 6 and 7 input terminals of AC7 are coupled to a reference voltage Vref. The 1, 2, 3, 4, 5, 6, and 7 input terminals of AC0 are coupled to A1 through A7, respectively. The 2 through 7 input terminals of AC1 are coupled to A2 through A7, respectively. The 3 through 7 input terminals of AC2 are coupled to AC3 through AC7, respectively. The 4 through 7 input terminals of AC3 are coupled to A4 through A7, respectively. The 5 through 7 input terminals of AC4 are coupled to A5 through A7, respectively. The 6 and 7 input terminals of AC5 are coupled to A6 and A7, respectively. The 7 input terminals of AC6 is coupled to A7.

A clock line C1, which may be denoted as a clock conduit path, is coupled to each of ARC0 through ARC7 and to input terminals of inverter circuits I01, I11, . . . I71. The output terminal of each of I01, I11, . . . I71 is coupled to AC0, AC1, . . . AC7, respectively. A reset line R is illustrated coupled to each of AC0, AC1, . . . AC7. An output terminal of each of ARC0 through ARC7 is coupled to an input terminal of inverters I02, I12, . . . I72, respectively. An output terminal of each of I02, I12, . . . I72 is coupled to the 0 input terminal of AC0, AC1, . . . AC7, respectively.

Figure 2:
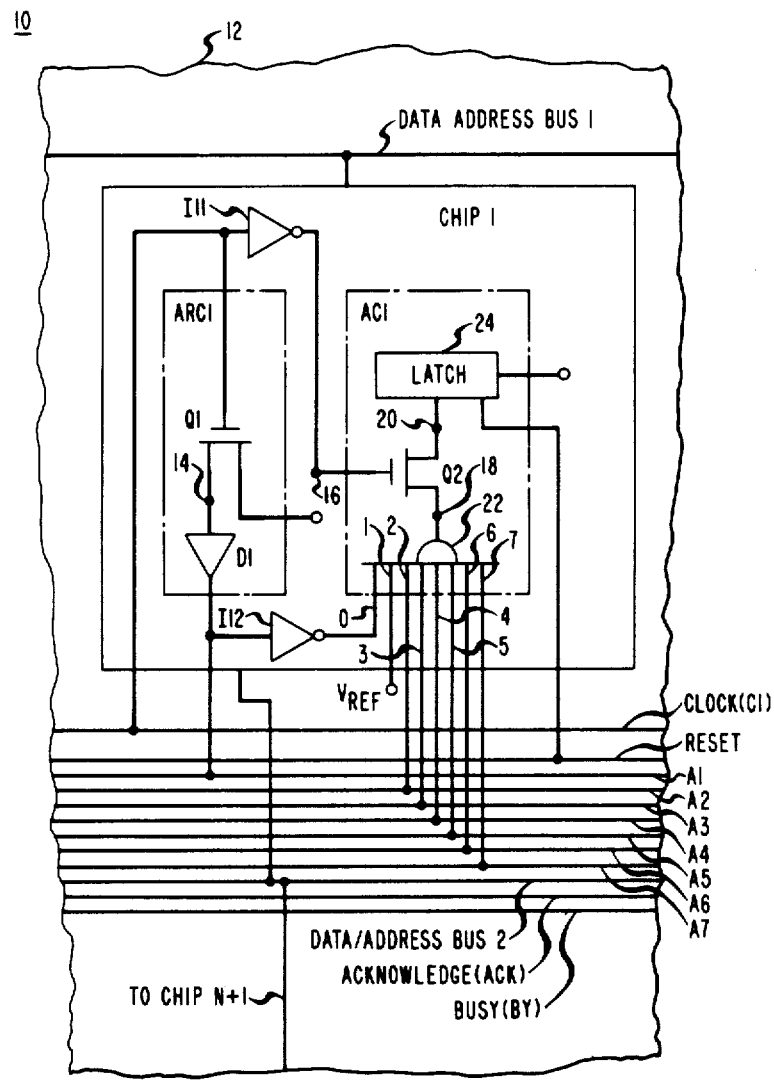
FIG. 2 illustrates circuitry of arbitration request circuit and arbitration resolution circuit in a component circuit of FIG. 1.

Referring now to FIG. 2, there is illustrated a portion of system 10 of FIG. 1 which illustrates component parts of ARC1 and AC1. Each of ARC0 and ARC2 through ARC7 has essentially the same structure as ARC1. Each of AC0 and AC2 through AC7 has essentially the same structure as AC1. ARC1 comprises a gating device Q1, illustrated as a field effect transistor, and a non-inverting driver circuit D1. The gate of Q1 is coupled to C1. A first output terminal of Q1 and an input terminal of D1 are coupled to a node 14. A second output terminal of Q1 is coupled to portions of chip 1 which determine if chip 1 desires access to data/address bus 2. An output terminal of D1 is coupled to A1 and to an input terminal of inverter I12. AC1 comprises an eight input AND gate 22 having input terminals 0, 1, 2, 3, 4, 5, 6 and 7, a gating device Q2, illustrated as a field effect transistor, and a latch circuit 24. The gate of Q2 is coupled to an output terminal of inverter circuit I11 and to a node 16. An input terminal of I11 is coupled to C1. An output terminal of the AND gate is coupled to one output terminal of Q2 and to a node 18. A second output terminal of Q2 is coupled to an input terminal of the latch circuit 24 and to a node 20. An output terminal of the latch circuit is coupled to a portion of chip 2 which enables chip 2 to send information onto data/address bus 2.

The operation of Chips 0, 1, 2, 3, 4, 5, 6, and 7 is essentially as follows. At the beginning of a cycle of operation the clock signal and reset signal both go high, a "1". This sets the output terminals of all the latch circuits of AC0 through AC7 all to low's, "0". At the start the beginning of a subsequent cycle of the clock (i.e., the clock goes from a "0" to a "1"), reset switches from a "1" to a "0" and each of Chips 0 through 7 will generate a "1" or a "0" from its associated ARC circuit. A "1" indicates that the chip generating the "1" does not need to gain access to data/address bus 2 at this time. A "0" indicates that the chip generating the "0" seeks access to data/address bus 2 at this time. Chips 0 through 7 have been, for illustrative purposes only, configured and connected such that the chip 7 has the highest priority (i.e., if it needs access to data/address bus 2 it gains access independent of whether or not any of the other seven chips needs access) and chip 0 has the lowest priority (i.e., only if none of the other seven chips needs access does chip 0 gain same). The preselected priority decreases with the numerical assignment of the chip.

The magnitude and polarity of reference voltage Vref is selected such that it is at a logic "1" level. If chip 7 sends a "0" from ARC7 onto A7, then the seventh input terminal of each of the AND gates of AC0 through AC6 receives one "0" input signal and thus the output signals of each of same are all "0's". During the second half of this clock cycle (i.e., the clock signal is a "0") each of the gating means (i.e., Q2) of each of AC0 through AC6 becomes enabled and the "0" at the output terminals of the seven AND gates becomes input signals to each of the seven latch circuits. This causes the output of each of these seven latch circuits to be at a "0" level. This causes each of chips 0 through 6 to disable any information it desires to send onto data/address bus 2 from reaching data/address bus 2. AC7 receives "1" input signals on input terminals 1 through 7 of AC7 because same are coupled to Vref, and receives a "1" on input terminal 0 since ARC7 is generating a "0" which is inverted by I72. The eight "1" input signals to the AND gate of AC7 cause the output terminal thereof to assume a "1" level. During the second part of the clock cycle Q2 of AC7 is enabled and the "1" signal becomes an input to the latch circuit of AC7. This causes the output terminal of this latch circuit to be set to a "1" which allows chip 7 to transmit information onto data/address bus 2.

Now assume that chip 1 desires during a subsequent cycle of the clock to transmit information onto data/address bus 2 and all chips having a higher priority do not need to so transmit information at this time. This results in A2 through A7 being "1's" and A1 being a "0". A1 being a "0" will inhibit (prevent) chip 0 from gaining access to data/address bus 2 since one of the inputs to its AND gate of AC0 is a "0" and thus the AND gate of AC0 has a "0" output and the corresponding latch circuit likewise will have a "0" output when the clock goes low (a "0"). The 1 through 7 input terminals of the AND gate of AC1 are all "1's" as is the 0 input terminal since ARC1 is a "1". This causes the latch circuit of AC1 to be a "1" which in turn causes the output terminal of the latch circuit to be a "1". This allows chip 1 to transmit information onto data/address bus 2. If chip 1 needs to transmit, but one or more of the chips with a higher priority also needs to so transmit, then chip 1 will not transmit because one or more of the 1 through 7 input terminals of its AND gate of AC1 will be "0's".

Now assume that chip 0 desires during a subsequent cycle of the clock to transmit information into data/address bus 2 and all other chips do not so desire. All of the 1 through 7 input terminals of the AND gate of AC0 are "1's" and the 0 input terminal thereof is also a "1".

With all of the eight input terminals of the AND gate of AC0 being "1's", the output of the AND gate becomes a "1" and during the next part of the clock cycle the latch circuit associated therewith assumes a "1" output level. This results in chip 0 transmitting information onto data/address bus 2. I02 can be eliminated in some instances since it is not really always needed because the output terminal of the AND gate of AC0 can assure a "1" whether or not input terminal 0 is a "1". This results in chip 0 transmitting "random data" at all times when no chip needs to transmit. Typically transmitted information contains at least one bit which indicates that same is valid. If chip 0 is transmitting without that bit then the information will effectively be ignored by all other chips. The leaving out of I02 allows chip 0 not to have to request access to data/address bus 2 and to yet gain same, assuming no other chip is requesting same at the same time. This saves one cycle of operation of the clock and thus enhances speed performance.

If chip 0 and another chip simultaneously need to transmit onto data/address bus 2 then, the other chip disables AC0 and gains access to data/address bus 2.

After a chip gain access to bus 2 it will then during the first half of the next cycle of the clock transmit the information which will be received by all of the other chips coupled to bus 2. The transmitted information is decoded during the second half of this cycle, and only one chip or several chips which are intended to be recipients of the information will receive and decode same. The chip(s) which receives the transmitted information will send back during the first half of the next clock cycle an acknowledgment signal on the ACK line (ACK) or a busy signal on the busy line (BY). If the information sending chip receives an acknowledgment signal it will not resend the same information again. It will subsequently transmit the same information if it receives a busy signal or no return signal.

The embodiments described herein are intended to be illustrative of the general principles of the present invention. Various modifications are possible consistent with the spirit of the invention. For example, each of the 1 through 7 inputs to the AND gate of AC0 through AC7 can be connected to circuitry which can be programmed and reprogrammed to couple the input terminals to a multiple of different combinations of A1 through A7 such that the priority of any chip can be modified at any time prior to the need to gain access to a data/address bus. ARC0 through ARC7 also are coupled through programmable and reprogrammable circuitry such that same can be coupled as desired. Still further, multiple other chips on the same wafer and coupled to another data/address bus can also have distributed arbitration request circuits and arbitration resolution circuits contained on all of the chips which selectively need access to that data/address bus. Still further, separate data/address buses can be coupled together via gating circuits. Still further, the data/address buses can be aluminum, doped polysilicon or other conductors, or optical connections such as optical fiber, or air. Still further, the wafer and chips can be a III-V semiconductor compound such as, e.g., gallium arsenide and gallium arsenide indium phosphide. Still further, some of the chips may provide biasing for a bus and may not send information onto the bus. Still further, the number of chips can be essentially any number over two. Still further, multicycle arbitration can be done. Still further, other types of gates could be substituted for the AND gates if the input signals thereto are changed. Still further, the wafer, which may be referred to as a carrier, can have circuits (chips) or other components attached thereto which are not of the same material as each other or as the carrier. Still further, the component circuits can be formed in and be a part of wafer 12. Still further, each ARC could be a separate integrated circuit chip and each AC could be a separate integrated circuit chip. Still further, an ARC and an AC could be one common integrated circuit chip with the circuitry which would function with same being on a second chip. Finally, all component circuits, together with all conduit paths and arbitration circuits—i.e., all the circuitry shown in FIG. 1—can be integrated in a single semiconductor chip of sufficient area to accommodate all such circuitry.

What is claimed is:

1. Apparatus comprising:
   a plurality of component circuits, each of said circuits being coupled to a signal conduit path and selectively needing to transmit information onto the signal conduit path, and each of said component circuits being integrated in a separate semiconductor chip;
   a plurality of arbitration conduit paths;
   a carrier, each of the chips being coupled thereto or being a part thereof, a body portion of the carrier and a body portion of at least some of the chips being essentially of the same semiconductor material;
   each of the component circuits assigned a priority with respect to transmission of information onto the signal conduit path;
   each of the component circuits, except for possible the component circuit having the lowest priority, including a separate one of a plurality of arbitration request circuits;
   each arbitration request circuit coupled to a separate one of a plurality of arbitration conduit paths for selectively enabling a signal from its component circuit to reach the signal conduit path coupled thereto;
   each of the component circuits, except for possibly the component circuit having a highest priority, including a separate one of a plurality of arbitration resolution circuits;
   each arbitration resolution circuit coupled to at least one of the arbitration conduit paths to detect whether any of the other component circuits having a higher priority is requesting access to the signal conduit path and to enable its component circuit to gain access to the signal conduit path if its component circuit is requesting access to the signal conduit path and if its component circuit has a higher priority than any other component circuit which is requesting such access;
   a clock conduit path which is coupled to each of the component circuits;
   each arbitration request circuit comprising a first transmission gate element having a control terminal which is coupled to the clock conduit path and having first and second output terminals which are separately coupled respectively to a portion of the component circuit which determines if the component circuit desires access to the signal conduit path and, except for possibly the one such transmission gate element in the component circuit of lowest priority, to a separate one of the arbitration conduit paths;
   each arbitration resolution circuit including a separate binary logic gate, or the equivalent thereof, which has a number of input terminals equal to at least the number of component circuits of higher priority;
   each of the input terminals of the logic gate coupled to a separate one of the arbitration conduit paths or to a node which is connected to a potential level; and
   each arbitration resolution circuit further including a latch circuit element and a second transmission gate element having a control terminal which is coupled through an inverter to the clock conduit path and having first and second output terminals which are separately coupled respectively to an output terminal of the logic gate and to an input terminal of the latch circuit element.

2. The apparatus of claim 1 wherein each said semiconductor chip is essentially silicon.

3. The apparatus of claim 2 wherein the silicon is single-crystal silicon.

4. The apparatus of claim 1 wherein each said semiconductor chip is essentially a III-V semiconductor compound.

5. The apparatus of claim 1 wherein the body portion of the carrier is silicon.

6. The apparatus of claim 5 wherein the signal conduit path is a data bus which is a conductor and the body portion of some of the component circuits is silicon.

7. The apparatus of claim 6 wherein a body portion of the carrier and a body portion of each of some of the component circuits are essentially of a single-crystal silicon.

8. The apparatus of claim 7 wherein both the carrier and the chips are parts of a silicon member.

9. The apparatus of claim 8 wherein the silicon member is a silicon wafer.

10. The apparatus of claim 1 wherein the carrier and the component circuits are all essentially of a III-V semiconductor compound.

11. The apparatus of claim 1 wherein the signal conduit path is air or an optical fiber or other optically responsive material.

12. The apparatus of claim 1 wherein the signal conduit path is a conductor such as aluminum or doped polysilicon.

13. The apparatus of claim 1 wherein the priority of each of the component circuits is changeable.

14. The apparatus of claim 1 in which the logic gate is an AND gate.

15. Circuitry comprising:
   a plurality of component circuits, each of said circuits being coupled to a signal conduit path and selectively needing access to the signal conduit path,
   each of the component circuits assigned a priority of access to the signal conduit path;
   a plurality of arbitration conduit paths, each assigned a separate associated priority corresponding to the priority of a separate one of the component circuits,
   each of the component circuits, except for possibly the component circuit having the lowest priority, including a separate one of a plurality of arbitration request circuits,
   each of the component circuits, except for possibly the component circuit having a highest priority, including a separate one of a plurality of arbitration resolution circuits; and a clock conduit path for propagating a clock signal, each said arbitration request circuit comprising a first transmission gate element having a control terminal which is coupled, through first coupling means, to the clock conduit path and having first and second output terminals which are separately coupled respectively to a portion of the component circuit which determines if the component circuit desires access to the signal conduit path and, except for possibly the one such transmission gate element in the component circuit of lowest priority, to a separate one of the arbitration conduit paths, each said arbitration resolution circuit including a separate binary logic gate, or the equivalent thereof, which has a number of input terminals equal to a least one more than the number of component circuits of higher priority, each of the input terminals of the logic gate in the arbitration resolution circuit of a given one of the component circuits coupled to a separate one of the arbitration conduit paths of higher priority or to the second output terminal of the first transmission gate of the arbitration request circuit of the given one of the component circuits, and each said arbitration resolution circuit further including a latch circuit element and a second transmission gate element having a control terminal which is coupled, through second coupling means complementary to coupling means to the clock conduit path and having first and second output terminals which are separately coupled respectively to an output terminal of the logic gate and to an input terminal of the latch circuit element.

16. Circuitry according to claim 15 in which at least one of the logic gates has another input terminal which is coupled to a node connected to a potential level.

17. Circuitry according to claim 15, whereby a subset of the input terminals of the logic gate in the arbitration resolution circuit of the given one of the component circuits is coupled to all arbitration conduit paths of higher priority.

18. Circuitry according to claim 17 in which at least one of the logic gates has another input terminal which is coupled to a node connected to a potential level.

19. Circuitry according to claim 15 further comprising a reset conduit path coupled to each of the latch elements for resetting them.

* * * * *